Oct. 9, 1923.

G. GLAUDEL

CLAMP

Filed March 1, 1922

1,470,115

Inventor:
GEORGE GLAUDEL.
BY Hazard & Miller
Attorneys.

Patented Oct. 9, 1923.

1,470,115

UNITED STATES PATENT OFFICE.

GEORGE GLAUDEL, OF LOS ANGELES, CALIFORNIA, ASSIGNOR OF ONE-HALF TO GEORGE L. MITCHELL, OF SANTA MONICA, CALIFORNIA.

CLAMP.

Application filed March 1, 1922. Serial No. 540,355.

*To all whom it may concern:*

Be it known that I, GEORGE GLAUDEL, a citizen of France, residing at Los Angeles, in the county of Los Angeles and State of California, have invented new and useful Improvements in Clamps, of which the following is a specification.

My invention relates to clamps or vises of that character employed for engaging and supporting auxiliary windshields, and a purpose of my invention is the provision of a clamp constructed in accordance with the clamps or vises disclosed in my Patent No. 1,386,565, issued August 2, 1921, in which the clamp is adjustable to accommodate and securely clamp panes of glass of various thicknesses.

Although I will describe only one form of clamp embodying my invention and point out the novel features thereof in claims, it is to be understood that various changes and modifications may be made herein without departing from the spirit and scope of such claims.

In the accompanying drawings.

Figures 1, 2:
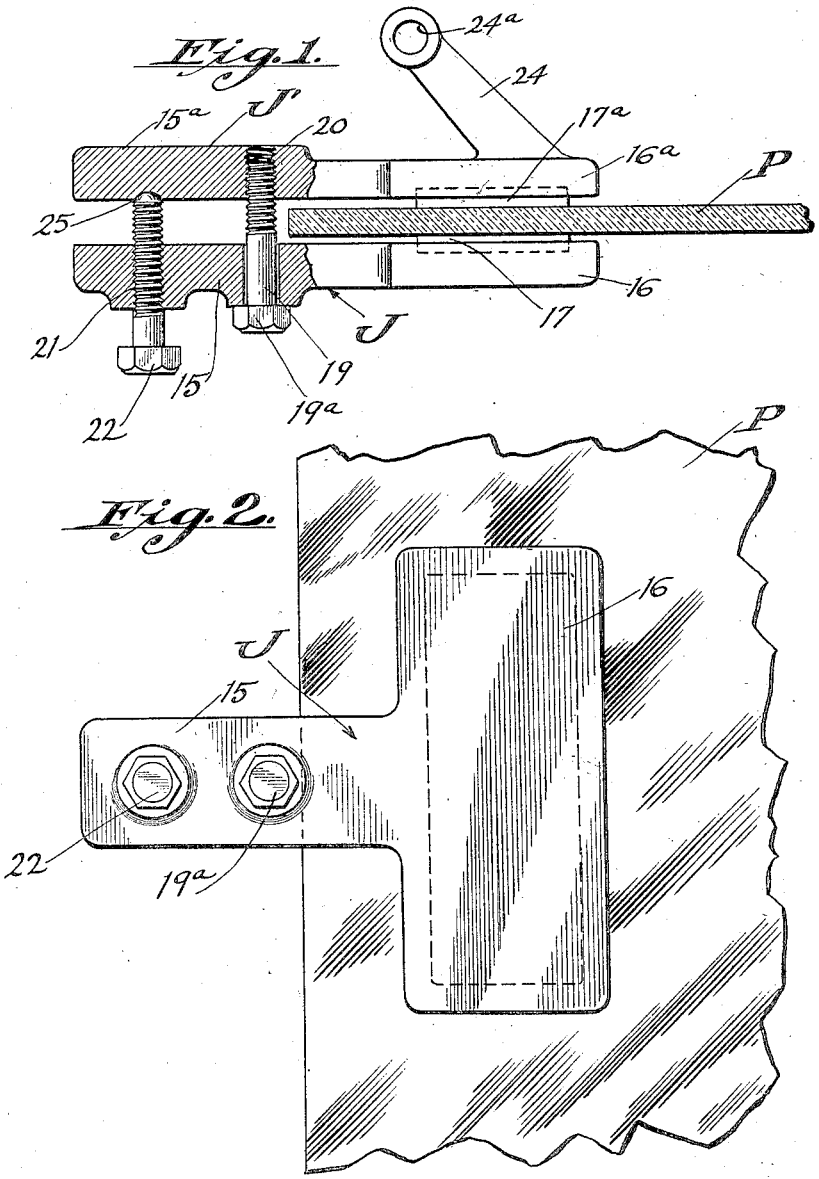
Figure 1 is a view showing in top plan and partly in section one form of clamp embodying my invention in applied position with respect to a pane of glass.
Fig. 2 is a view showing the clamp in side elevation and in applied position.

Referring specifically to the drawings in which similar reference characters refer to similar parts, my invention, in its present embodiment, comprises a pair of jaws designated generally at J and J', each of which includes a body portion 15 or 15ª and extensions 16 or 16ª, the latter being of any desirable form to provide the necessary area for effectively clamping a plate, such as a pane of glass P. These extensions in the present instance are shown of rectangular outline with their confronting sides grooved to receive yieldable strips 17 and 17ª, respectively, designated to have contact with the glass plate P in the manner clearly shown in Fig. 1.

The body 15 of the jaw J is formed with an opening 18 throughout which loosely passes the shank of a clamping screw 19 so that the head 19ª thereof abuts the side of the body as shown in Fig. 1. The threaded shank of the screw threadedly engages the wall of an opening 20 formed in the body 15ª so that by rotation of the screw, the jaw J' can be moved toward or away from the jaw J. The body portion 15 is also formed with an opening 21 in which is threadedly fitted a set screw 22. The inner end of the set screw is rounded and is adapted to fit within a recess 25 formed in the body 15ª. This set screw serves to space the jaws and limit the movement of the body portions toward each other, while the clamping screw 19 operates to draw the jaws into clamping engagement with respect to the plate P.

To provide a pivotal mounting for the clamp as a unit, the extension 16ª is formed on its outer face with an arm 24 which extends in the direction of the length of the jaw as clearly shown in Fig. 1. The free end of the arm 24 is provided with an opening 24ª which receives a pivot pin (not shown) by which the clamp may be mounted on any suitable support to swing horizontally.

In practice, the jaws of the clamp can be adjusted to allow of the insertion of the glass plate between the extensions 16 and 16ª by unscrewing the clamping screw 19. The set screw 22 is now adjusted to position the jaws substantially parallel with each other so that on screwing up the screw 19 the jaws will be drawn together to position the strips 17 and 17ª in firm contact with the opposite sides of the plate P. The set screw 22 reposing in the recess 25 provides a fulcrum point for the jaw J' so that as the clamping screw is tightened, the forward ends of the jaws tend to move toward each other rapidly as compared to the intermediate parts, it being obvious that the drawing force is applied at a point intermediate of the fulcrum point provided by the set screw 22. By this operation, the maximum pressure of the jaws is exerted at the extensions 16 and 16ª so that the plate is firmly held between the extensions. The opening 18 of the body 15ª allows of sufficient movement of the clamping screw to compensate for the relative movement of the two jaws. The strips 17 and 17ª by virtue of their yielding quality compensate for the relative difference of movement between the outer and intermediate parts of the clamp so that they contact equally at all points with the plate.

What I claim is:

1. A clamp comprising a pair of jaw members each of which is formed with a block-like body portion having an elongated extension projecting in continuation of said body portion; a set screw threaded through the body portion of one of said jaw members to project into a recess on the inner face of the other jaw member, to act as an adjustable fulcrum, a tightening screw disposed intermediate of said set screw and the outer ends of said extension and passing loosely through the body portion carrying the set screw and threaded into the other body portion, said tightening screw having a head arranged to bear on the outer face of the jaw member through which it passes to engage the latter, and yieldable strips secured to the inner face of the extensions of said jaw members.

2. A clamp comprising a pair of jaws including body portions and extensions formed on the body portions, a set screw threaded through the body portion of one of said jaws and engaging the body portion of the other jaw, a clamping screw disposed between the set screw and the free ends of the extensions and passing loosely through the body portion carrying the set screw and threaded into the other body portion, and yieldable strips secured to the confronting faces of said extensions.

In testimony whereof I have signed my name to this specification.

GEORGE GLAUDEL.